United States Patent [19]

Nagane

[11] Patent Number: 4,542,414
[45] Date of Patent: Sep. 17, 1985

[54] ORIGINAL READING APPARATUS
[75] Inventor: Hiromichi Nagane, Tokyo, Japan
[73] Assignee: Canon Kabushiki Kaisha, Tokyo, Japan
[21] Appl. No.: 523,186
[22] Filed: Aug. 15, 1983
[30] Foreign Application Priority Data Aug. 24, 1982 [JP] Japan ................................. 57-146478
Aug. 31, 1982 [JP] Japan ................................. 57-149935

[51] Int. Cl.⁴ .......................... H04N 1/04; H04N 9/10; H04N 1/10; H04N 1/40
[52] U.S. Cl. ..................................... 358/285; 358/53; 358/293; 358/294; 271/272
[58] Field of Search ................. 358/285, 293, 294, 53; 271/272, 273, 274

[56] References Cited
U.S. PATENT DOCUMENTS

3,064,077 11/1962 Cary ..................................... 358/286
3,661,383 5/1972 Morrison ............................. 271/273
4,199,789 4/1980 Yvard ................................... 358/293
4,275,423 6/1981 Takahashi et al. .................. 358/285
4,384,781 5/1983 Takada ................................. 271/273
4,442,459 4/1984 Fukui et al. ......................... 358/293
4,496,984 1/1985 Stoffel ................................. 358/286

Primary Examiner—Howard W. Britton
Assistant Examiner—John K. Peng
Attorney, Agent, or Firm—Fitzpatrick, Cella, Harper & Scinto

[57] ABSTRACT

A conveying mechanism for conveying an original with the image bearing surface thereof facing upward while nipping the original is divided into a first portion and a second portion. The first portion is provided in a lower box member and the second portion is provided in an upper box member. The upper box member is capable of being opened and closed relative to the lower box member. A solid state image sensor and an optical system for projecting the image of an original onto the solid state image sensor are provided in the upper box member.

6 Claims, 6 Drawing Figures

ORIGINAL READING APPARATUS

BACKGROUND OF THE INVENTION

1. Field of the Invention

This invention relates to an original reading apparatus for use in a facsimile apparatus, a laser beam printer or other image processing apparatus.

2. Description of the Prior Art

In most original reading apparatuses, the optical system is disposed below the conveyance path of the original.

Figure 1:
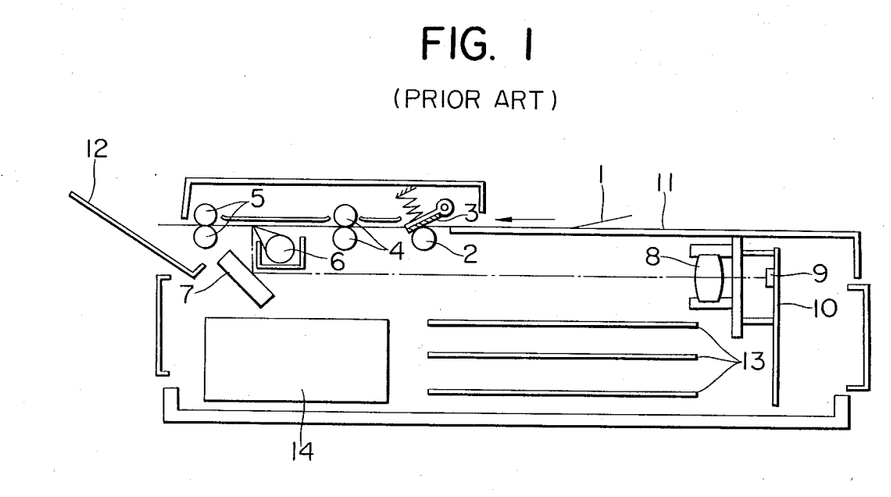
FIG. 1 illustrates an apparatus according to the prior art.

In FIG. 1 of the accompanying drawings, reference numeral 1 designates an original to be read, reference numeral 2 denotes the feed roller of a separating portion, reference numeral 3 designates the separating friction piece of the separating portion, reference numeral 4 denotes a pair of feed rollers, reference numeral 5 designates a pair of paper discharge rollers, reference numeral 6 denotes an illuminating light source, reference numeral 7 designates a reflecting mirror, reference numeral 8 denotes a lens, reference numeral 9 denotes a solid state image sensor such as CCD, reference numeral 10 designates a printed circuit plate for photoelectric conversion, reference numeral 11 denotes an original carriage, reference numeral 12 designates an original tray, reference numeral 13 denotes a prited circuit plate for control, and reference numeral 14 designates a power source.

The apparatus shown in FIG. 1 is a typical example of the horizontal conveyance of an original and the reading of the information of the lower surface of the original, and such an apparatus has suffered from the disadvantages described below.

Parts forming the optical system are disposed below the conveyance path of the original and therefore, a large space for the optical path must be secured within the apparatus body, and this leads to the difficulty with which the apparatus is made compact.

Since the optical system is disposed at the center of the apparatus, it is difficult to construct the optical system alone as a unit. Also, to endow the apparatus with strength, the structure of the housing must be strengthened and for the optical system, the entire apparatus is made more rigid than necessary. Accordingly, the entire apparatus becomes heavy. Also, the entire apparatus is endowed with rigidity and therefore, it is difficult to separate the optical system and adjust it as a unit and in addition, the production process is limited and it is difficult to make the apparatus inexpensive. Also, where the reflecting mirror 7 faces upward as shown in FIG. 1, the influence of dust adhering to the mirror upon the image is great, and this has led to the necessity of adding a special device for cleaning the mirror or to the increased frequency of the cleaning service, which in turn has led to increased cost.

Figure 2:
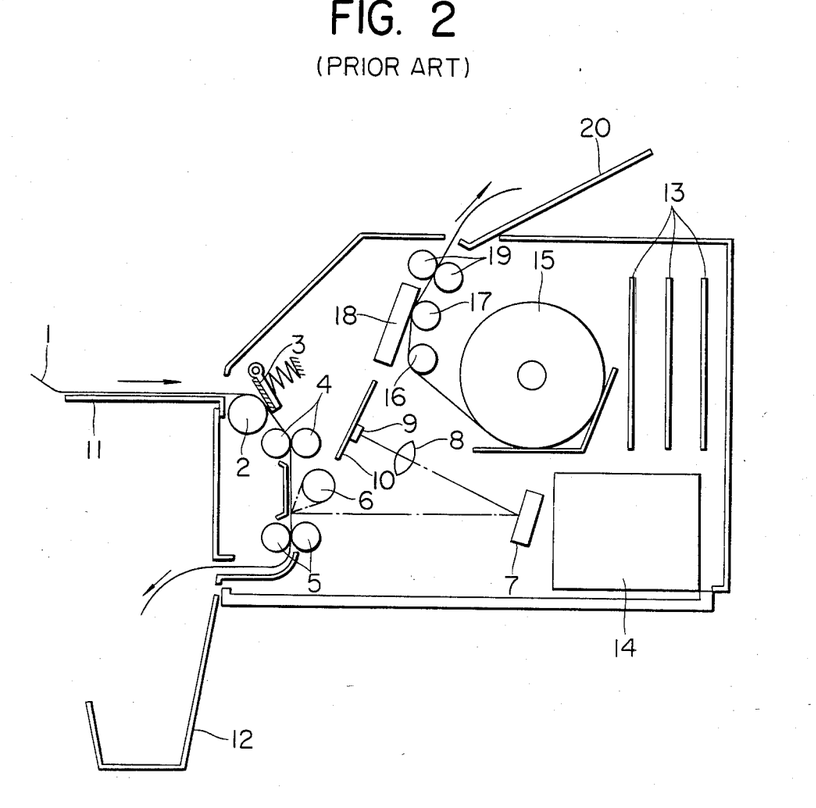
FIG. 2 also illustrates an apparatus according to the prior art.

Also, in the prior art, there is an apparatus in which the optical system is turned back to make the apparatus compact, such as an apparatus shown in FIG. 2 of the accompanying drawings.

In FIG. 2, reference numerals similar to those in FIG. 1 designate similar members. Reference numeral 15 designates a roll of recording paper, reference numeral 16 denotes an idle roller, reference numeral 17 designates a platen roller, reference numeral 18 denotes a recording head such as a thermal head, reference numeral 19 designates a pair of paper discharge rollers, and reference numeral 20 denotes a tray for the recording paper.

In the case of such an apparatus, the original is not conveyed horizontally but is U-turned in the apparatus and therefore, the conveyance path of the original in the apparatus is long and according, the probability of jamming is high. Also, to open the conveying surface for the original, a complicated mechanism is required because the conveying surface for the original lies in the interior of the apparatus body, and this has led to the expensiveness of the apparatus.

Also, in the apparatus of the prior art, the illuminating light source of the optical system which is a consumption part, such as a fluorescent lamp or halogen lamp, is disposed in the interior of the apparatus and therefore, replacement of the light source has usually required some trouble, or where the apparatus is designed to enable the user to replace the light source, there is the necessity of adding a special mechanism, which has led to the complexity and expensiveness of the apparatus.

SUMMARY OF THE INVENTION

It is an object of the present invention to proide an apparatus which can eliminate the abovenoted inconveniences of the apparatus according to the prior art.

It is another object of the present invention to provide an apparatus which can be made compact.

It is still another object of the present invention to provide an apparatus in which the treatment of jamming of an original is easy to make.

Other objects and features of the present invention will become apparent from the following detailed decription taken in conjunction with the accompanying drawings.

BRIEF DESCRIPTION OF THE DRAWINGS

FIG. 3 is a perspective view of an embodiment of the present invention in which the interior of an upper box member is seen through.

DESCRIPTION OF THE PREFERRED EMBODIMENT

Figure 3:
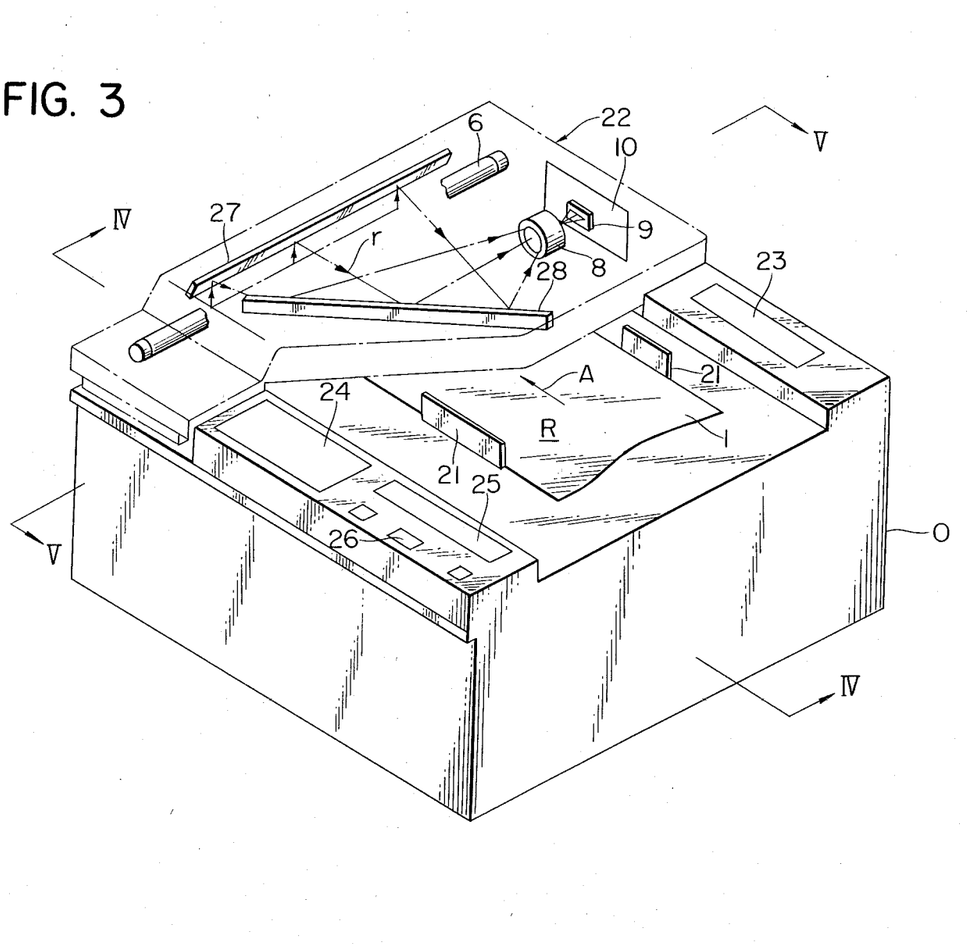
Figure 4:
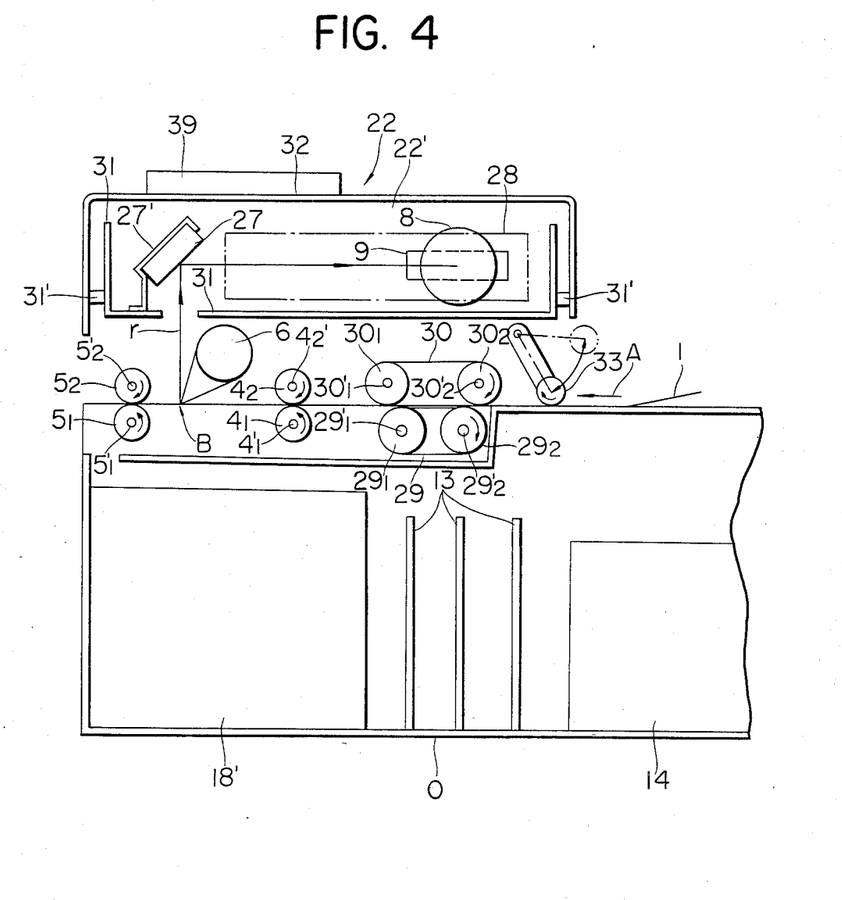
FIG. 4 is a cross-sectional view taken along line IV—IV of FIG. 3.
Figure 5:
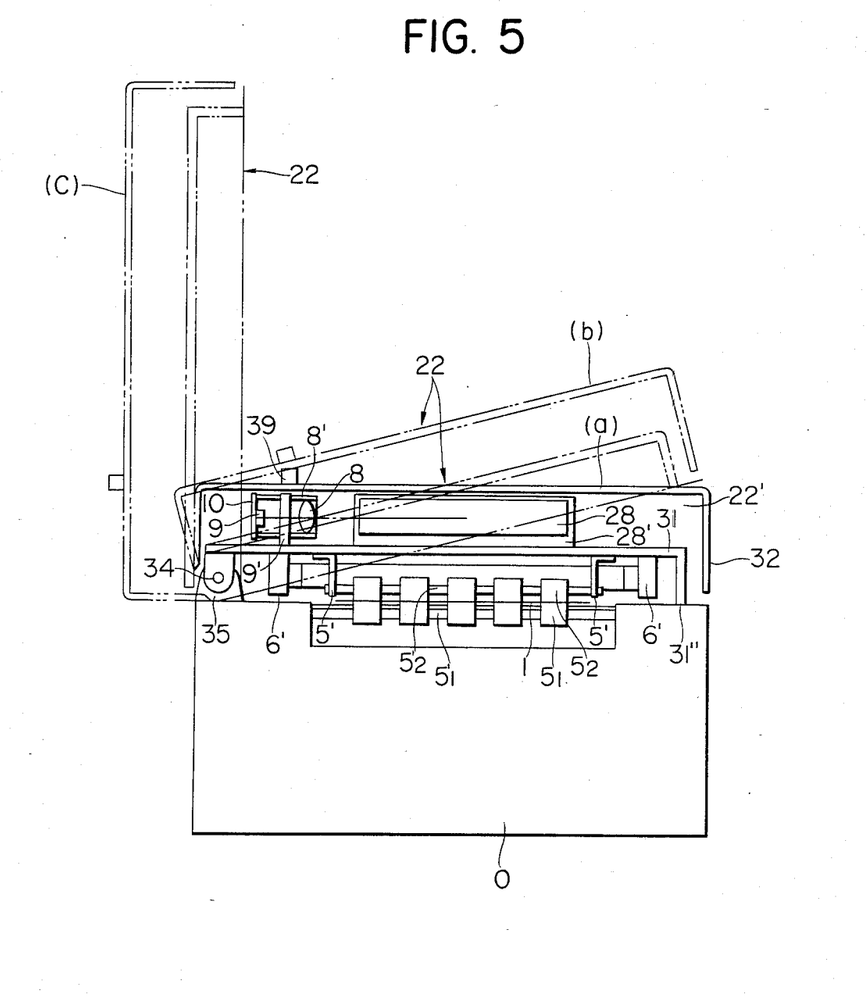
FIG. 5 is a cross-sectional view taken along line V—V of FIG. 3.

Referring to FIGS. 3, 4 and 5, reference character 0 designates a lower box member and reference numeral 22 denotes an upper box member. An auxiliary switch 24, an operation procedure display portion 25 and an operating switch 26 are provided on the outer surface of the lower box member 0 on this side thereof as viewed in FIG. 3, and a display portion 23 is provided on the outer surface of the lower box member 0 on the inner side thereof as viewed in FIG. 3. As shown in FIG. 4, a printed circuit plate 13 for control, a power source transformer 14 and an information signal recording device 18' of the type which records information on thermosensitive paper by means of a thermal head are contained in the lower box member 0.

As shown in FIG. 3, an original 1 to be read is conveyed to a reading station with the upper information bearing surface R thereof facing upward. Arrow A indicates the direction of conveyance of the original, and reference numeral 21 designates original side edge adjusting plates for positioning the side edges of the original when the original is inserted into the reading apparatus. The original 1 is inserted in the apparatus while being placed on the upper surface of the lower box member 0. Thus, when the original 1 is inserted in the direction of arrow A (for example, in a horizontal direction), an auxiliary feed roller 33 is lowered by drive means such as a plunger, not shown, in FIG. 4, to initially convey the original 1 in the direction of arrow A, and only one sheet of original is conveyed in the direction of arrow A by the separating belt 29 and feeding belt 30 of an original separating portion and thereafter, is conveyed while being nipped between a pair of paper feed rollers $4_1$, $4_2$ and a pair of paper discharge rollers $5_1$, $5_2$, whereby it passes through the reading station B illuminated by an illuminating light source 6 such as a fluorescent lamp and is discharged onto an original tray (not shown).

The reflected light r from the original 1 illuminated by the illuminating light source 6 is reflected in a direction parallel to the conveyance path of the original 1 and opposite to the direction of conveyance A of the original 1 by a first mirror 27 downwardly disposed so as to be opposed to the upper surface R of the original and is reflected in a direction parallel to the conveyance path of the original 1 and perpendicular to the direction of conveyance A of the original 1 by a second mirror 28, and is imaged on a solid state image sensor 9 such as CCD by a lens 8. The optical axis of the lens 8 is parallel to the original conveyance path and perpendicular to the direction of conveyance A of the original. The original 1 is scanned in the major scanning direction by the drive of the sensor 9 and also, the original 1 is scanned in the minor scanning direction by the movement thereof in the direction of arrow A. The output of the sensor 9 is converted into a digital signal by an electronic circuit on the printed circuit plate 10 and the digital signal in turn is transmitted, stored or visualized in accordance with the function and usage of the apparatus.

By the light r from the original being reflected in the direction opposite to the direction of conveyance A of the original by the mirror 27 as described above, the inconvenience that the upper box member 22 juts out in the direction A to make it difficult for the original discharged from the apparatus to be handled can be solved and, by the light r being reflected in the direction perpendicular to the direction A by the mirror 28, the inconvenience that the upper box member 22 juts out in the direction opposite to the direction A to make it difficult for the original to be inserted can be prevented. Thus, the upper box member 22 can be made compact by the light r being reflected by the mirrors 27 and 28 as described above. The mirror 27 which is downwardly disposed does not permit dust to adhere thereto and thus can prevent deterioration of the image of the original.

The upper box member 22 has a base plate 31 and an outer plate 32 fixed to the base plate 31 by a fixing member 31', and the two plates 31 and 32 form a chamber 22' for containing therein the mirrors 27, 28, the lens 8, the sensor 9 and the circuit substrate 10. A support plate 27' to which the mirror 27 is fixed and a support plate 28' (FIG. 5) to which the mirror 28 is fixed are fixed to the base plate 31. On the other hand, the circuit substrate 10 to which the sensor 9 is fixed and the lens 8 are fixed to a support cylinder 8' which in turn is fixed to the base plate 31 by a fixing member 9'. In the manner described above, the upper box member 22 is constructed as an image reading unit. Accordingly, the image reading apparatus can be assembled separately from the lower box member and the productivity of the apparatus is improved.

The lamp 6 and the upper portion of the original conveying means are attached to the lower side of the base plate 31. Reference numeral 6' designates a socket fixed to the base plate 31, and the lamp 6 is fixedly supported by the socket 6'. Reference numeral 5' denotes a support member fixed to the base plate 31, and a roller shaft $5_2'$ provided with a paper discharge roller $5_2$ is rotatably supported by this support member 5'. A roller shaft $4_2$ provided with a paper feed roller $4_2$ and the roller shafts $30_1'$ and $30_2'$ of belt driving rollers $30_1$ and $30_2$ over which a belt 30 is passed are also supported by support members (fixed to the base plate 31) similar to the support member 5', but these support members are not shown for simplicity of illustration.

On the other hand, a shaft $5_1'$ provided with a paper discharge roller $5_1$, a shaft $4_1'$ provided with a paper feed roller $4_1$ and the shafts $29_1'$ and $29_2'$ of drive rollers $29_1$ and $29_2$ over which a belt 29 is passed are supported by the lower box member 0.

The upper box member 22 is capable of being opened and closed relative to the lower box member 0. That is, as shown in FIG. 5, the upper box member 22 is supported for pivotal movement about a shaft 34 supported by a support member 35 fixed to the lower box member 0. In FIG. 5, a position (a) is the position of the upper box member 22 when it is closed relative to the lower box member 0. When the upper box member 22 is in the position (a), the belts 29 and 30, the rollers $4_1$ and $4_2$ and the rollers $5_1$ and $5_2$ are engaged with each other and thus can convey the original while nipping it therebetween, and the image of the upper surface of the original 1 is read by the sensor 9 with the upper box member 22 being in the position (a).

When the original 1 being conveyed jams, the operator may manually open the upper box member 22 to a position (b) relative to the lower box member 0. At this time, the lamp 6, the mirrors 27, 28 the lens 8 and the sensor 9 are lifted with the upper box member 22 and the rollers $4_2$, $5_2$ and the belt 30 are also lifted with the upper box member 22. On the other hand, the rollers $4_1$, $5_1$ and the belt 29 remain in the lower box member 0 and therefore, the upper box member 22 and the lower box member 0 become spaced apart from each other with the conveyance path of the original as the boundary and this conveyance path is opened, thus facilitating removal of the original jammed in the conveyance path. Also, if the upper box member 22 is closed relative to the lower box member 0 with the middle portion of the original adjusted to a position B, reading of the original from the middle portion thereof will become possible.

Where the lamp 6 is to be replaced by a new lamp, the upper box member 22 is pivoted to a position (c) which is a position more open relative to the lower box member than the position (b). By the upper box member 22 being thus brought to the position (c), the lamp 6 becomes exposed outside the upper box member 22 and thus, the lamp 6 may be removed from the socket 6' and a new lamp may be inserted into the socket 6'.

The sensor 9 is disposed in the upper box member 22 at a position adjacent to the end thereof with respect to a direction perpendicular to the direction of conveyance of the original. As shown in FIG. 5, the upper box member 22 is engaged with a pivot shaft 34 on that side thereof on which the sensor 9 is disposed. Accordingly, the influence imparted to the sensor 9 by any shock or vibration created when the upper box member 22 is opened or closed relative to the lower box member 0 is small and therefore, positional deviation or the like of the sensor 9 is not liable to occur and thus, good image signals can be formed for a long period of time.

Also, the upper box member 22 has a fulcrum 34 on the inner side opposite to the front side of the apparatus, namely, that side on which the operating switch 26, etc. are provided, so that the entire upper box member 22 can be opened and closed with the conveying surface of the original 1 as the dividing plane by being manually pivoted upwardly of the apparatus in a direction perpendicular to the direction of conveyance of the original. This leads to the ease with which the opening closing operation is effected.

Although only one pivot shaft (fulcrum) 34 of the upper box member 22 is shown in FIG. 5, another pivot is provided on the inner side of the plane of the drawing sheet of FIG. 5 and the upper box member 22 is pivotally connected to the lower box member 0 at two locations. On the other hand, when the upper box member 22 is in the position (a), the end 31" of the base plate 31 bears against the upper surface of the lower box member 0 on this side of the apparatus (FIG. 5). Thus, the upper box member 22 when in the position (a) is supported at three points relative to the lower box member 0, and this means that the upper box member 22 is supported stably and with good positional accuracy.

Figure 6:
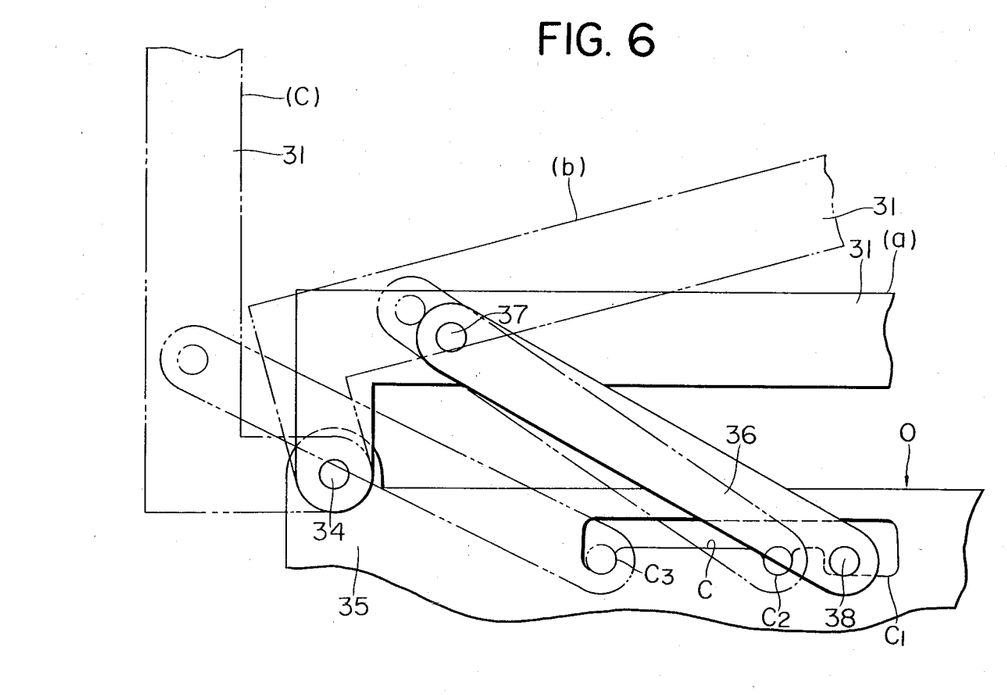
FIG. 6 illustrates an example of the open position selecting mechanism.

Description will now be made of a mechanism for selectively holding the upper box member 22 at the position (b) and the position (c). In FIG. 6, reference numeral 36 designates a lever pivotally connected to the base plate 31 by a shaft 37. Reference numeral 38 denotes a pin secured to the lever 36 and engaged with the cam surface C of a support bed 25 fixed to the lower box member 0. By the position at which the pin 38 is engaged with the cam surface C, the position of the upper box member 22 can be selectively fixed at the two positions (b) and (c). That is, when the upper box member 22 is in closed position relative to the lower box member 0 (when reading is to be effected), the pin 38 is engaged with the recess C1 of the cam surface C and, when jam is to be treated (when the upper box member 22 is in the position (b)), the pin 38 is received in the recess C2 of the cam surface C and locked thereby and, when the lamp is to be replaced with a new one (when the upper box member 22 is in the position (c)), the pin 38 is received in the recess C3 of the cam surface C and locked thereby.

Where the upper portion of the cover 32 of the upper box member 22 is used as a telephone supporting bed as a facsimile receiver, conduct of jamming or the like of the original can be sufficiently accomplished by bringing the upper box member 22 to the position (b) (the opening angle of about 15°) and in that case, the telephone or the like placed on the cover 32 need not be removed. In that case, if a stopper 39 for preventing slippage of the telephone is provided on the inner part of the cover 32, it will be more effective (FIG. 4).

In the above-described embodiment of the present invention, the upper box member 22 is designed to be opened and closed about two inner fulcrums 34 relative to the lower box member 0 and, where the apparatus is used for reading, the upper box member 22 is closed relative to the lower box member 0. Thus, the upper box member 22 is of such a construction that when it is in the position (a), the portion thereof on this side rides on the lower box member 0 from gravity. However, to ensure the upper box member 22 and the lower box member 0 to be coupled together more reliably, a lock mechanism may be provided or the attraction of a magnet or the like may be utilized.

Also, a toggle mechanism or a click mechanism provided by a compression spring may be utilized in the portion which provides the fulcrum for opening and closing so that when the upper box member 22 is opened relative to the lower box member 0, the upper box member 22 may not return to its original position unless the operator effects the closing operation, whereby better operability can be obtained.

The sensor is not restricted to CCD, but a long solid state image sensor may also be used and in that case, use may be made of an imaging optical system comprising a number of small-diameter imaging elements (for example, light transmitters having a refractive inex parabolically decreased from the center thereof toward the radially outward portion) arranged in an array and the mirrors may be omitted.

What I claim is:

1. An original reading apparatus comprising:
   a lower box member;
   an upper box member;
   support means supporting said upper box member openably and closably relative to said lower box member, said support means being provided on said lower box member and rotatably supporting said upper box member beside an original conveyance path in a direction perpendicular to a direction of conveyance of the original;
   image reading means provided in said upper box member and having a solid state image sensor means disposed in said upper box member and out of a conveyance path of the original, and an optical system for projecting the image of an original onto said solid state image sensor means, said optical system having a first mirror facing downward so as to be opposed to the original, for reflecting the light from the original in the direction opposite to the direction of conveyance of the original, a second mirror for reflecting the light from said first mirror in a traverse direction intersecting the direction of conveyance of the original so as to direct the light to said image sensor means, and a lens disposed between said second mirror and said image sensor means with the optical axis of said lens oriented in a traverse direction intersecting the direction of conveyance of the original;
   first conveyance means provided in said lower box member; and
   second conveying means provided in said upper box member, said second conveying means cooperating with said first conveying means to convey the original along said original conveyance path with said upper box member closed relative to said lower box member, the original being conveyed while being nipped between said first and second conveying means with the image bearing surface of the original facing upward, and said image reading means reading the information on the upper surface of the original;

said second conveying means being adapted to become spaced apart from said first conveying means when said upper box member is opened relative to said lower box member, thereby enabling the original to be removed from between said first and second conveying means.

2. An original reading apparatus according to claim 1, wherein the length of said upper box member in the direction of conveyance of the original is shorter than the length of the lower box member in the direction of conveyance of the original.

3. An original reading apparatus according to claim 2, wherein said lower box member provides an operating switch disposed at a position opposite to said support means with respect to the original conveyance path.

4. An original reading apparatus according to claim 2 or 3, wherein said support means supports said upper box member at two positions along said original conveyance path, and wherein, said upper box member is closed relative to said lower box member, one lower end portion of said upper box member abuts said lower box member at a position opposite to said support means with respect to said original conveyance path.

5. An original reading apparatus according to claim 2 or 3, wherein said upper box member is engaged with said support means provided on said lower box member, at a position of the side on which said solid state image sensor is provided.

6. An original reading apparatus according to claim 2 or 3, further comprising:

means for selectively holding said upper box member in a first open position in which said upper box member is opened relative to said lower box member and a second open position in which said upper box member is further opened relative to said lower box member than in said first open position.

* * * * *

UNITED STATES PATENT AND TRADEMARK OFFICE
CERTIFICATE OF CORRECTION

PATENT NO. : 4,542,414
DATED : September 17, 1985
INVENTOR(S) : HIROMICHI NAGANE It is certified that error appears in the above-identified patent and that said Letters Patent is hereby corrected as shown below:

Column 1: line 27, change "prited" to --printed--;
line 63, change "designates" to --designate--.

Column 2: line 6, change "according" to --accordingly--;
line 24, change "proide" to --provide--.

Column 3: line 33, after "as" insert --a--.

Column 6: line 20, after "to" insert --a--;
line 50, change "traverse" to --transverse--.

Column 8: line 1, before "said" insert -- when --.

Signed and Sealed this

Twenty-fourth Day of June 1986

[SEAL]

Attest:

DONALD J. QUIGG

Attesting Officer

Commissioner of Patents and Trademarks